(12) United States Patent
Wight et al.

(10) Patent No.: US 7,584,210 B2
(45) Date of Patent: *Sep. 1, 2009

(54) METHOD AND APPARATUS FOR CREATION AND MAINTENANCE OF DATABASE STRUCTURE

(75) Inventors: Robert Wight, Celebration, FL (US); Josh Griffin, Kissimmee, FL (US); Timothy Tryzbiak, Kissimmee, FL (US); Anibal Santiago, Kissimmee, FL (US); Dale Couch, Orlando, FL (US); Edward H. Benson, III, Celebration, FL (US); David A. Crossmier, III, Oviedo, FL (US); David M. Schrader, Windermere, FL (US)

(73) Assignee: Channel Intelligence, Inc., Celebration, FL (US)

( * ) Notice: Subject to any disclaimer, the term of this patent is extended or adjusted under 35 U.S.C. 154(b) by 503 days.

This patent is subject to a terminal disclaimer.

(21) Appl. No.: 11/068,424

(22) Filed: Feb. 28, 2005

(65) Prior Publication Data

US 2005/0149547 A1 Jul. 7, 2005

Related U.S. Application Data

(63) Continuation of application No. 10/035,635, filed on Dec. 28, 2001, now Pat. No. 6,917,941.

(51) Int. Cl.
*G06F 17/30* (2006.01)
(52) U.S. Cl. .................... 707/103 R; 707/3; 705/26
(58) Field of Classification Search ............... 707/100, 707/101, 1, 103 R–103 Z, 200, 3–5, 10; 705/26
See application file for complete search history.

(56) References Cited

U.S. PATENT DOCUMENTS

| | | | |
|---|---|---|---|
| 5,004,270 A | 4/1991 | Broderick et al. | |
| 5,047,614 A | 9/1991 | Bianco | |
| 5,361,871 A | 11/1994 | Gupta et al. | |
| 5,630,068 A | 5/1997 | Vela et al. | |
| 5,696,366 A | 12/1997 | Ziarno | |

(Continued)

FOREIGN PATENT DOCUMENTS

WO    WO-00/39738 A1    7/2000

(Continued)

*Primary Examiner*—Cheryl Lewis
(74) *Attorney, Agent, or Firm*—Patton Boggs LLP

(57) ABSTRACT

The invention provides a method for configuring a database system to store information regarding a plurality of items, the method comprising: establishing a database on a computer system; establishing within the database a first object corresponding to a first item of the plurality of items; generating within the first object at least one field; associating a field identifier with each the field; and storing at least a portion of the information within each the field; the database system configured to store information regarding a plurality of items, each item in the plurality of items having at least one item attribute, the database system comprising a computer having memory, a database stored in said memory, a first object in said database corresponding to one item of the plurality of items, said first object corresponding to the first item, at least one field in said first object, a field identifier associated with each said field, and information regarding said first item stored in said first object.

16 Claims, 7 Drawing Sheets

U.S. PATENT DOCUMENTS

| | | | |
|---|---|---|---|
| 5,754,981 | A | 5/1998 | Veeneman et al. |
| 5,774,874 | A | 6/1998 | Veeneman et al. |
| 5,870,716 | A | 2/1999 | Sugiyama et al. |
| 5,898,594 | A | 4/1999 | Leason et al. |
| 5,909,023 | A | 6/1999 | Ono et al. |
| 5,970,474 | A | 10/1999 | LeRoy et al. |
| 5,999,914 | A | 12/1999 | Blinn et al. |
| 6,026,376 | A | 2/2000 | Kenney |
| 6,076,091 | A | 6/2000 | Fohn et al. |
| 6,167,383 | A * | 12/2000 | Henson ............ 705/26 |
| 6,535,880 | B1 | 3/2003 | Musgrove et al. |
| 6,609,106 | B1 | 8/2003 | Robertson |
| 6,643,624 | B2 | 11/2003 | Philippe et al. |
| 6,691,112 | B1 | 2/2004 | Siegel et al. |
| 6,693,236 | B1 | 2/2004 | Gould et al. |
| 6,725,222 | B1 | 4/2004 | Musgrove et al. |
| 6,917,941 | B2 * | 7/2005 | Wight et al. ............ 707/10 |
| 7,136,829 | B2 | 11/2006 | Hellal et al. |
| 2001/0037259 | A1 | 11/2001 | Sharma et al. |
| 2002/0062275 | A1 | 5/2002 | Dyke |
| 2002/0069153 | A1 | 6/2002 | Lin |
| 2002/0152131 | A1 | 10/2002 | Lee |
| 2002/0184102 | A1 | 12/2002 | Markopoulos et al. |
| 2003/0018540 | A1 | 1/2003 | Volpi et al. |
| 2003/0080999 | A1 | 5/2003 | Stone et al. |
| 2003/0131021 | A1 | 7/2003 | Wight et al. |
| 2003/0167209 | A1 | 9/2003 | Hsieh |
| 2003/0167222 | A1 | 9/2003 | Mehrotra et al. |
| 2003/0172005 | A1 | 9/2003 | Hellal et al. |
| 2003/0225632 | A1 | 12/2003 | Tong et al. |
| 2004/0107145 | A1 | 6/2004 | Skurdal et al. |
| 2004/0249643 | A1 | 12/2004 | Ouyang et al. |
| 2004/0249723 | A1 | 12/2004 | Mayer |
| 2005/0004880 | A1 | 1/2005 | Musgrove et al. |

FOREIGN PATENT DOCUMENTS

WO    WO-01/27837 A2    4/2001

* cited by examiner

FIG. 7

TAPE 80 DRIVE (1111-01)

The Tape 80 offers a 40/80 GB capacity and a 3/6 MB/second transfer rate. The Tape 80 is packaged in a standard 5-1/4" half-high form factor and is configured as an integration-ready internal unit. The Tape 80 uses standard DLTape™ IV media, and boasts backward read capability with the DLT 4000 and DLT1 formats.

| Sort by: | Product Name | Sort by: Price | In Stock | Sort by: Gomez Merchant rating |
|---|---|---|---|---|
| Vendor A  Buy | TAPE 80 DRIVE - 1111 - 01 | $1,449.00 | Yes | ★★★ |
| Vendor B  Buy | TAPE 80 DRIVE (1111-01) | $1,449.99 | Yes | ★★★ |
| Vendor C  Buy | TAPE 80 | $1,449.95 | See Site | ★★★ |

METHOD AND APPARATUS FOR CREATION AND MAINTENANCE OF DATABASE STRUCTURE

RELATED APPLICATIONS

This application is a continuation of, and claims the benefit of the priority of, U.S. application Ser. No. 10/035,635, now U.S. Pat. No. 6,917,941 filed Dec. 28, 2001.

BACKGROUND OF THE INVENTION

1. Field of the Invention

The present invention relates generally to the field of relational databases. More particularly, the present invention relates to a relational database that facilitates electronic commerce or "e-commerce" as conducted on an electronic communications network through the creation, maintenance and update of electronic lists, made up of items in the database, from any point on the electronic communication network.

2. Statement of the Problem

The growth of electronic communications networks, such as the Internet, as well as various intranets, extranets, and other local area networks (LANs) and wide area networks (WANs) has presented a fertile ground in which to transact commerce. The amount of commerce transacted on-line over these networks has grown such that online or electronic commerce (also known as "e-commerce") has become a major channel through which goods and services are bought and sold. In parallel with the growth in electronic commerce has come a growth in the information available regarding the goods and services available for sale online. As this growth has occurred, online providers of goods and services have sought to develop ever more efficient means of linking potential customers with the goods and services sought by those potential customers.

Despite these efforts, inefficiencies continue to pervade the mechanisms used to transact e-commerce. At present, potential customers have numerous locations from which to obtain information regarding goods and services for sale online. Many of these locations provide the potential customers with the ability to capture and evaluate information regarding the goods and services for sale at that particular location. However, the potential customers are not provided with a satisfactory tool for capturing, cataloging and evaluating the information gathered at all of these locations against each other, nor are they provided with a tool for updating the information that they have captured and cataloged. Likewise, potential customers are left with no tool for capturing information regarding products and services for sale online and products and services for sale offline in a single location. Instead, the potential customer is left to individually visit multiple locations to manually catalog the information captured at one location against information captured at other locations. The potential customer must manually evaluate the information captured online against other information captured online and against information captured offline. Potential customers are further required to individually re-visit each location (both online or offline) to update previously captured information. Without an adequate tool that enables the potential customer to efficiently and effectively capture, aggregate, catalog, evaluate, and update information from all sources in a single place, potential customers find themselves ill equipped to evaluate the myriad collection of often varying prices, inventories, and terms under which the goods and services that they are seeking to purchase are being offered for sale both online and offline. As a result, the online purchasing process often proves far less efficient and effective than other sales channels. Untold online business opportunity is lost when potential customers become overwhelmed with the information available to them in the online purchasing process and never reach the point of consummating their sale. Likewise, untold future sales are lost as post-sale frustration ensues when the customers realize that their purchase did not take place at the price and on the terms that were the most favorable available to them at the time of sale because they failed to fully and effectively evaluate all of the information and options available to them both online and offline.

Thus, while e-commerce is a viable channel of selling goods and services, from the viewpoint of the consumer, it is often not an efficient and effective channel of buying goods and services. It would be highly desirable to have a method and apparatus that enabled consumers to more fully utilize the possibilities of e-commerce.

3. Solution to the Problem

The invention solves the problems described by providing a single tool that allows the potential customer to capture and aggregate the volume of information regarding the products and services that are available to them online in a single database. Preferably, the single tool also allows the customer to capture and aggregate offline purchasing information in the same database. This tool preferably permits the analysis of all information, captured both online and offline, in a single location. Preferably, the location can be any computer connected to the Internet that is available to the potential customer. The tool preferably provides potential customers with automated updates of the information regarding the goods and services that the potential customer is considering purchasing throughout the period of time during which the potential customer is making a purchasing decision. Likewise, once a decision to purchase a good or service is made, the tool preferably provides a direct path online to the dealers of that good or service. The tool is preferably independent of any given online or offline provider of goods or services, and "sits above" the network through which providers offer their goods and services for sale. The tool allows the potential customer to efficiently and effectively locate and evaluate information regarding goods and services offered by many providers, preferably both on and offline, without tying the potential customer to any one provider.

The invention further solves the problems described by providing a single tool that allows a manufacturer to establish and maintain a display on its web site. The display of information preferably contains information regarding the vendors at which the products produced by the manufacturer are offered for sale, either online or offline. The present invention allows a manufacturer to establish a direct link from the display of information to the web sites of the vendors offering the manufacturer's products for sale online. Preferably, the display of information includes information regarding the price, availability, and features of the manufacturer's products. The information displayed is automatically updated with changes in existing information or new information. Preferably, the manufacturer may customize the display of information to include only the information regarding its products, and only the vendors offering its products, that the manufacturer desires to include in the display.

The invention preferably provides a data structure for facilitating the efficient storage and retrieval of information regarding the products and services in the form of a database. The information regarding each product or service is stored in the form of an object in the database. Each object contains a number of fields. Each field in each object in the database corresponds to a defined attribute of the products and services to be stored in the database. Preferably, each object contains a field corresponding to an attribute of the product or service stored in that object for which there is information available. The attribute to which each field corresponds is preferably also one of the defined attributes of the products and services to be stored in the database. Preferably, each field has an associated identifier corresponding to the attribute to which the field corresponds. Preferably each object has an associated identifier corresponding to the product or service stored in the object. Preferably, objects and fields are able to be referenced and retrieved from the database by way of their identifiers.

The invention provides a method for configuring a database system to store information regarding a plurality of items, the method comprising: establishing a database on a computer system; establishing within the database a first object corresponding to a first item of the plurality of items; generating within the first object at least one field; associating a field identifier with each the field; and storing at least a portion of the information within each the field. Preferably, for the plurality of items, the method further provides: defining at least one attribute of the plurality of items; creating a field identifier corresponding to each defined attribute of the plurality of items, the field identifiers comprising a set of field identifiers; and wherein the step of generating comprises: obtaining item information regarding the first item; dividing the item information into at least one category, wherein each category corresponds to a field identifier; and generating within the first object a field corresponding to each the category. Preferably, the step of associating comprises, for each field: selecting from the set of field identifiers the field identifier that corresponds to the same defined attribute of the plurality of items that the field corresponds to; and associating the selected field identifier with the field. Preferably, each the field identifier is unique. Preferably, each the field identifier includes a numeric code. Preferably, each defined attribute of the plurality of items describes a trait of the plurality of items and each defined attribute of the item describes a trait of the item. Preferably, the step of defining at least one attribute of the plurality of items comprises: obtaining information regarding the plurality of items; dividing the information regarding the plurality of items into at least one category; and defining an attribute of the plurality of items that describes the information in each category. Preferably, the information regarding the plurality of items is obtained from an analysis of the plurality of items. Preferably, the item information is obtained from an analysis of the plurality of items. Preferably, the step of storing comprises, for each the field, storing in the field the item information in the category corresponding to the field.

Preferably, each field is identifiable and retrievable from the database by way the field identifier. Preferably, each field identifier is unique. Preferably, the information regarding the first item is a first product or a first service. Preferably, the information within each field is information regarding the first product or the first service, respectively. Preferably, the database is a relational database. Preferably, an object identifier is associated with each object identifier. Preferably, each object identifier is unique. Preferably, each object identifier is a user name and password. Preferably, each object is identifiable and retrievable from the database by way of the object identifier.

In another aspect, the invention provides a method for configuring a database system to store information regarding a plurality of items, the method comprising, for each item in the plurality of items, defining at least one attribute of the plurality of items, creating a field identifier corresponding to each defined attribute of the plurality of items, the field identifiers together comprising a set of field identifiers, establishing a database on a computer system; establishing within the database a first object corresponding to a first item of the plurality of items, obtaining item information regarding the first item, dividing the item information into at least one category, wherein each category corresponds to a field identifier, generating within the first object a field corresponding to each category, selecting from the set of field identifiers the field identifier that corresponds to the same defined attribute of the plurality of items that the field corresponds to, associating the selected field identifier with the field, and, for each field, storing in the field the item information in the category corresponding to the field.

In another aspect, the invention provides a database system configured to store information regarding a plurality of items, each item in the plurality of items having at least one item attribute, the database system comprising: a computer having memory, a database stored in the memory, a first object in the database corresponding to one item of the plurality of items, the first object corresponding to the first item, at least one field in the first object, a field identifier associated with each field; and information regarding the first item stored in the first object. Preferably, the plurality of items have a predetermined set of attributes, and the computer system includes a predetermined list of field identifiers, each field identifier in the predetermined list corresponding to one of the predetermined set of attributes, and the at least one field comprises one field corresponding to each attribute in the predetermined set of attributes for which information is known regarding the first item. Preferably, the at least one field comprises one field corresponding to each attribute in the predetermined set of attributes that is also an item attribute of the first item. Each field identifier associated with each field preferably comprises the field identifier corresponding to the attribute in the predetermined set of attributes to which the field corresponds. Preferably, the field identifier associated with each the field comprises an identifier unique to the attribute in the predetermined set of attributes to which the field identifier corresponds. Preferably, each field identifier associated with each field comprises a unique field identifier. Preferably, each field identifier associated with each field comprises a numeric code. Each attribute of the predetermined set of attributes preferably comprises a trait of the plurality of items and each attribute of each item in the plurality of items comprises a trait of that item. Preferably, the information regarding the first item stored in the first object comprises information regarding the first item stored in each field of the first object. Preferably, the information stored in each field of the first object corresponds to the same attribute of the first item to which the field corresponds. The database is preferably adapted to categorize the information regarding each item into categories wherein the information in each category describes an attribute of the item, and define the attribute described by the information in each category. Preferably, each field in the first object is identifiable and retrievable from the database by way of the field identifier associated with that field. Preferably, the information regarding the plurality of items comprises information regarding a plurality of products, services, or product and services. The database preferably comprises a relational database. Preferably, an object identifier is associated with the first object. Preferably, each object identifier comprises a unique identifier. Preferably, each object identifier comprises a user name and password. Preferably, the first object is identifiable and retrievable from the database by way of the object identifier.

In another aspect, the invention provides a method for configuring a database system to store a plurality of lists containing information regarding a plurality of items, the method comprising: establishing a list database on a server computer system, the list database including a first list associated with a first list identifier, establishing a management tool on a client computer system, remote from the server computer system, the management tool including the list identifier, establishing a communications link between the client computer system and the server computer system, retrieving the first list from the list database to the management tool responsive to the first list identifier, revising the retrieved first list, and updating the first list in the list database to reflect the revision to the retrieved first list. Preferably, the step of establishing a list database comprises: establishing within the list database a first list object corresponding to the first list, generating within the first list object a first list field, associating a first list identifier with the first list object. Preferably, the step of retrieving comprises retrieving the first list object from the list database. Preferably, the step of revising comprises storing in the first list field of the retrieved first list object information regarding one of the plurality of items, the one of the plurality of items being the first item. Preferably, the step of updating comprises updating the first list object in the list database to reflect the revision to the retrieved first list object. The step of generating preferably comprises associating a first list field identifier with the first list field, the first list field identifier corresponding to the information stored in the first list field. Preferably, the step of revising comprises storing in the first list field information corresponding to the first list field identifier. The step of associating preferably comprises: generating the first list identifier, and associating the first list identifier with the first list object. Preferably, the first list identifier is unique. Preferably, the first list identifier includes a user name and password generated by a user of the list database.

Preferably, the step of revising comprises: establishing an item database on the server computer system, the item database including stored information relating to the first item; and creating a pointer in the first list field referencing the information relating to the first item stored in the item database. The step of revising preferably comprises: establishing an item database on the server computer system, the item database including stored information relating to the first item, and creating a copy in the first list field of the information relating to the first item stored in the item database. The step of revising further preferably comprises, responsive to a command issued to the management tool, identifying the first list field and revising the first list field to remove the stored information regarding the first item from the first list field. The step of revising further preferably comprises: establishing an item database on the server computer system, the item database including first item information relating to a first item, and responsive to a command issued by the management tool, revising the first list field to include a pointer referencing the first item. Preferably, the method comprises retrieving the first item information from the item database to the management tool; and displaying a graphical representation of the first item information on a user interface of the management tool.

Preferably, the step of revising comprises: capturing information relating to a first provided item, and the step of revising comprises revising the first list field to include a pointer referencing the first provided item. The step of capturing preferably comprises: establishing a communications link between the client computer system and an item provider computer system, the item provider computer system remote from the client computer system and including information relating to a first provided item, responsive to a command issued to the management tool, locating the first provided item on the item provider computer system, and capturing the information relating to the first provided item. Preferably, the step of capturing comprises: providing a template database on a template database server computer system remote from the client computer system, the template database including one or more templates, each corresponding to an information structure, determining a structure for the information relating to the first provided item, retrieving a template corresponding to the structure from the template database to the management tool, applying the template to the provided item information to parse the information relating to the first provided item, and capturing the parsed information with the management tool. Preferably, the step of revising comprises: establishing an item database on the server computer system, the item database storing information relating to a plurality of items, comparing the captured information relating to the first provided item with the information stored in the item database relating to the plurality of items, responsive to a pre-established rule, revising the information stored in the item database relating to the plurality of items to include the information relating to the first provided item. Preferably, the step of revising comprises revising the first list field to include a pointer referencing the information relating to first provided item in the item database. Preferably, the step of responsive to a pre-established rule, revising the information stored in the item database relating to the plurality of items comprises: determining if the information stored in the item database relating to the plurality of items includes the captured information relating to the first provided item, and revising the information stored in the item database relating to the plurality of items to include the captured information relating to the first provided item if the information stored in the item database relating to the plurality of items does not include the captured information relating to the first provided item.

Preferably, the step of revising comprises: providing information relating to a first provided item to the management tool, establishing an item database on the server computer system, the item database storing information relating to a plurality of items, revising the information stored in the item database relating to the plurality of items to include the information relating to the first provided item. Preferably, the step of revising comprises revising the first list field to include a pointer referencing the information relating to the first provided item in the item database.

Preferably, the first list field stores information regarding a first item. Preferably, responsive to a command issued by the management tool, the method includes the steps of establishing a communications link between the client computer system and an item provider computer system, the item provider computer system remote from the client computer system and offering the first item for sale, and facilitating the purchase of the first item from the item provider computer system. Preferably, the step of revising comprises the step of capturing purchase information relating to the purchase of the first item and updating the first list in the list database to reflect the inclusion of the purchase information in the retrieved first list. The purchase information preferably comprises information relating to one or more of: price, quantity, shipping method, and delivery date. The step of establishing a communications link between the client computer system and the server computer system preferably comprises establishing a communications link using one or more of the Internet, a wide area network, and a local area network. The step of establishing a communications link between the client computer system and the list database server computer system preferably comprises: providing a browser tool on the client computer system, instructing the browser tool to locate the item provider computer system; and instructing the browser tool to search the item provider computer system for the provided item information.

Preferably, the method comprises: establishing an item database on the server computer system, establishing within the item database a first item object corresponding to the first item, generating within the first item object at least one item field, associating an item field identifier with each item field, and storing at least a portion of the information regarding the first item within each item field. The step of revising preferably comprises storing in the first list field of the retrieved first list object a pointer referencing the first item object.

Preferably, the method comprises: establishing an item database on the server computer system, the item database storing information relating to the plurality of items, capturing information regarding a first provided item and information regarding a provider of the first provided item, comparing the captured information with the information stored in the item database relating to the plurality of items to determine if the captured information is included in the information stored in the item database, and revising the item database to any captured information not included in the information stored in the item database. Preferably, the step of revising comprises: establishing within the item database a first item object corresponding the first provided item, generating within the first item object at least one item field, associating an item field identifier with each item field, and storing a portion of the information regarding the first provided item within each item field. Preferably, the step of revising comprises establishing within the item database a first provider object corresponding to the item provider, generating within the first provider object at least one item field, associating a provider field identifier with each the provider field, and storing a portion of the information regarding the item provider within each provider field. Preferably, the item database includes a first item object, comprising associating the provider object with the first item object. Preferably, the step of revising comprises storing in the first list field of the retrieved first list object a pointer referencing the first item object. Preferably, the first list includes a first item and wherein the step of revising comprises the step of, responsive to a command issued to the management tool, identifying the first item and revising the retrieved first list to remove the first item from the retrieved list.

The step of step of revising preferably comprises: establishing an item database on an item database server computer system remote from the client computer system, the item database including item information relating to a first item, responsive to a command issued by the management tool, retrieving the item information from the item database to the management tool, and responsive to a command issued by the management tool, capturing the item information relating to the first item, and revising the retrieved first list to include the item information relating to the first item.

The step of revising comprises: establishing a communications link between the client computer system and an item provider computer system, the item provider computer system remote from the client computer system and including information relating to a first provided item, responsive to a command issued to the client computer system, locating the first provided item on the item provider computer system, capturing the information relating to the first provided item with the management tool, and responsive to a command issued by the management tool, revising the retrieved first list to include the information relating to the first provided item. Preferably, the step of capturing comprises: providing a template database on a template database server computer system remote from the client computer system, the template database including one or more templates, each corresponding to an information structure, determining a structure for the information relating to the first provided item, retrieving a template corresponding to the structure from the template database to the management tool, applying the template to the provided item information to parse the information relating to he first provided item; and capturing the parsed information with the management tool. Preferably, the step of revising the retrieved first list comprises establishing an item database on an item database server computer system remote from the client computer system, the item database including stored information relating to a first item, comparing the information relating to the first provided item with the stored information relating to the first item, responsive to a pre-established rule, revising the stored information relating to the first item to include the information relating to the first provided item, and responsive to a command issued to the management tool, revising the retrieved first list to include the information relating to the first provided item. Preferably, the step of responsive to a pre-established rule, revising the information relating to the first item comprises: determining if the information relating to the first provided item and the information relating to the first item relate to the same item, and revising the information relating to the first item to include the information relating to the first provided item if the information relating to the first item relates to the same item as the information relating to the first provided item. Preferably, the step of revising comprises providing information relating to a first provided item to the management tool, and, responsive to a command issued to the management tool, revising the retrieved first list to include the information relating to the first provided item.

Preferably, the retrieved first list includes a first item and the method comprises, responsive to a command issued by the management tool, establishing a communications link between the client computer system and an item provider computer system, the item provider computer system remote from the client computer system and offering the first item for sale, and purchasing the first item from the item provider computer system. Preferably, the step of revising comprises: capturing purchase information relating to the purchase of the first item, and updating the first list in the database to reflect the inclusion of the purchase information in the retrieved first list. Preferably, the purchase information comprises information relating to one or more of: price, quantity, shipping method, and delivery date. Preferably, the step of establishing a communications link between the client computer system and the list database server computer system comprises establishing a communications link using one or more of the Internet, a wide area network, and a local area network. Preferably, the step of establishing a communications link between the client computer system and the list database server computer system comprises, providing a browser tool on the client computer system, instructing the browser tool to locate the item provider computer system, and instructing the browser tool to search the item provider computer system for the provided item information.

In another aspect, the invention provides a method for creating an electronic list of items, the method comprising: establishing a list database on a server computer system, establishing a management tool on a client computer system remote from the server computer system, the management tool including a list identifier, establishing a communications link between the server computer system and the client computer system, responsive to a signal issued by the client computer, establishing a communications link to an item provider computer system remote from both the server computer system and the client computer system, locating an item on the item provider computer system, responsive to a command issued to the management tool, adding a pointer referencing the item to a list associated with the list identifier in the list database on the server computer system.

In another aspect, the invention provides a method for maintaining an electronic list, the method comprising: establishing a management tool on a client computer system, the management tool including a list identifier, establishing on a server computer system remote from the client computer system an item database including item information relating to a first item, and a list database including a list associated with the list identifier, the list including the first item, establishing a communications link to an item provider computer system remote from both the server computer system and the client computer system, responsive to a command from the server computer system, updating the item information in the item database; and responsive to a command issued to the client computer system and the list identifier, retrieving to the client computer system the updated information corresponding to an item on the list associated with the list identifier.

In another aspect, the invention provides a method for maintaining an electronic shopping list on a computer system linked to a network, the shopping list including at least one record, each record containing information relating to a product, the method comprising: establishing a shopping list management toolbar on an Internet browser on a client computer system, the client computer system in communication with the Internet, establishing on a server computer system in communication with the Internet, a shopping list database, the shopping list database including a first shopping list having a shopping list identifier, providing the shopping list identifier to the shopping list management toolbar, communicating the shopping list identifier to the shopping list database, retrieving a copy of the first shopping list from the shopping list database to the shopping list management toolbar responsive to the shopping list identifier, establishing communications via the Internet with a product provider computer system, the product database including product information relating to a first product, revising the retrieved copy of the first shopping list on the shopping list management toolbar to include a pointer referencing the product information relating to the first product, and updating the first shopping list in the shopping list database to reflect the revisions to the retrieved shopping list.

Numerous other features, objects and advantages of the invention will become apparent from the following description when read in conjunction with the accompanying drawings.

BRIEF DESCRIPTION OF THE DRAWINGS

FIGS. 6 and 7 are views of a computer screen depicting the operation of the user interface of the management tool in another embodiment of present invention.

DETAILED DESCRIPTION

Figure 1:
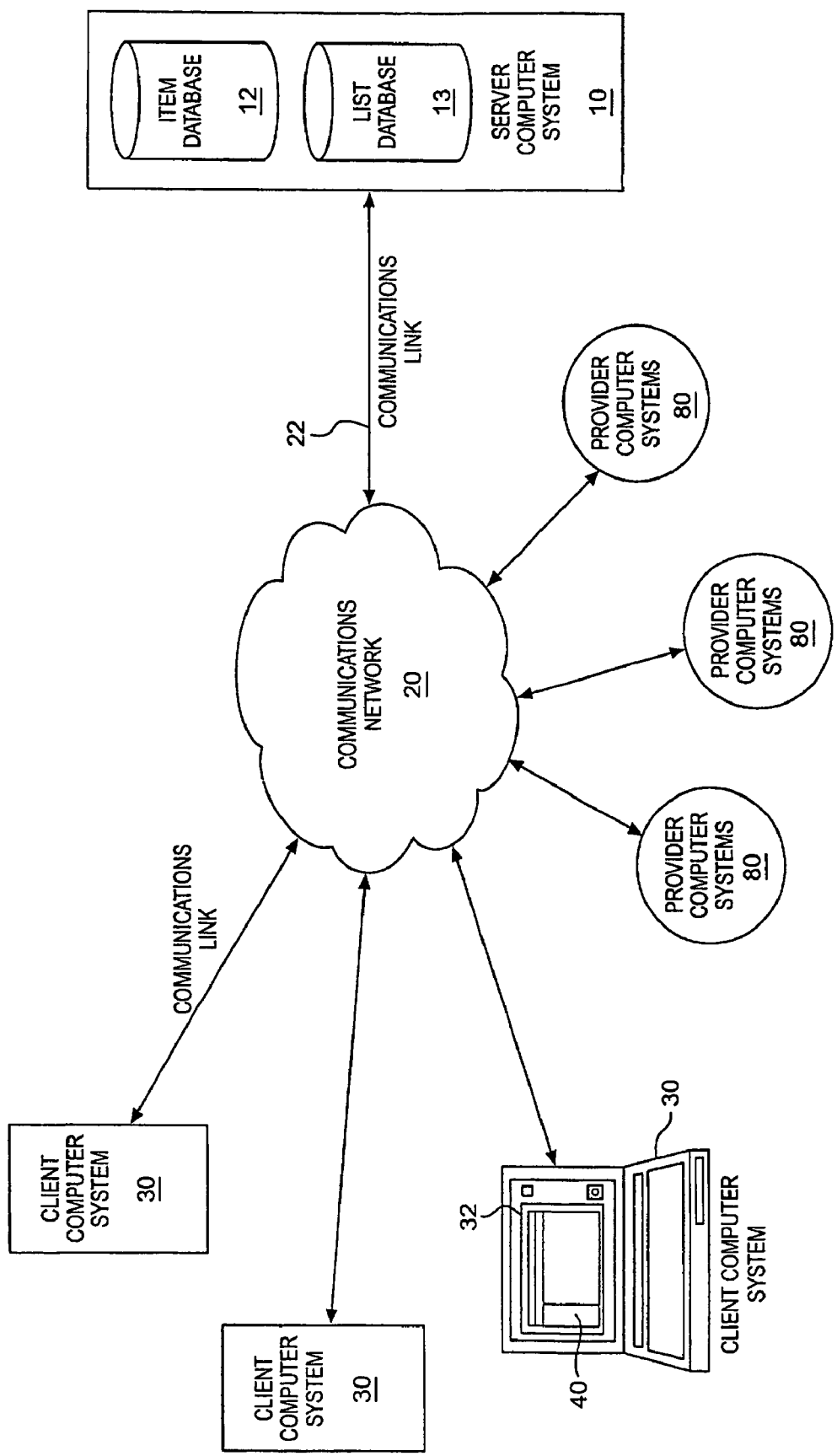
FIG. 1 is a block diagram of a preferred embodiment of a network on which the present invention is intended to operate.

As will be described in greater detail below, the present invention relates to a data structure for use in creating and maintaining electronic databases of information. Referring to FIG. 1, the embodiments of the present invention are implemented as logical operations in a computer system, such as 10 and 30. The logical operations of the embodiments of the present invention are implemented as a sequence of computer-implemented operations, steps or modules running in the form of computer software on the computing system. One of ordinary skill in the art will appreciate that the particular implementation of the operations, steps or modules comprising the present invention will depend on the decisions of the individual practicing the invention, the capabilities of the computer system or systems on which the present invention is to be implemented, and the demands to be placed on the present invention during operation. Accordingly, it is to be understood that the present invention need not be restricted to a single embodiment, and it is to be further understood that any embodiment implementing the operations, steps and modules described herein and shown in the attached drawings, and their equivalents, is intended to come within the scope of the present invention.

As will be described in greater detail below, databases and systems 12, 13, of databases embodying the data structure of the invention are particularly well-suited to the creation and maintenance of user-defined electronic lists of goods, services and other items. In one such embodiment, the invention allows online customers to create and maintain electronic lists 52 (FIG. 2) made up of products and services being offered for sale both on and off the Internet. An electronic list created by such an embodiment of the invention may be accessed from any computer 30 linked to the Internet, regardless of where the list was first created or last accessed. Once accessed, a list created by such an embodiment of the invention may be updated by capturing information from an online database of information, from a Web page on which a product or service is displayed, or manually from any source available to the user of the list. Each list created by such an embodiment of the invention is universal and is independent from any given single provider of goods or services. The list of such an embodiment of the invention facilitates automatic updating of the electronic list whenever new information, such as a lower price, relating to a good or service on the list becomes available. The invention may thus be used by an online customer to maintain a single electronic list having products and services that are offered for sale by various vendors or providers of goods or services. In another embodiment, the invention allows for manufacturers of goods and providers of services to establish lists of their own goods and services on their own web sites and to maintain direct links from those lists to web sites where those products and services are offered for sale. In this embodiment of the invention, online customers visiting the web site of a manufacturer or provider maintaining such a list are thus able to link directly to a web site on which they can purchase the product or service without leaving the web site of the manufacturer or provider. The list of this embodiment of the invention further facilitates automatic updating of the manufacturer's list as new information about the goods or services on the list, such as inventory and dealer stock, become available.

As noted above, the invention relates to a data structure for creating and maintaining a database. A database embodying the data structure of the present invention is implemented as a sequence of computer software operations, steps or modules on a computer system. In particular, a database embodying the data structure of the present invention takes the form of a relational database, such as 12 and 13, of the type accommodating the storage and retrieval of information in the form of records populating the database. Each record populating a database embodying the present invention takes the form of an object. Each object corresponds to a particular product, service, or other item and stores information relating to that product, service, or item. The information stored in each object includes information regarding one of the products, services, or other items about which information is stored the database. Each object may be provided with an object identifier used to identify that object within the database. The information is organized according to a data structure defined by fields. Each field is assigned a field identifier and stores information. The type of information stored in each field is determined by the field identifier given to the field. Each field identifier corresponds to a particular attribute, trait, or category of information describing the product, service or other item to which the object corresponds.

Table 1 contains a listing of field identifiers for a database storing objects that correspond to products, the names of the attributes corresponding to each field identifier, and the descriptions of the attributes corresponding to each field identifier. As shown in Table 1 below, a single field identifier is defined for each unique attribute. Fields bearing a particular field identifier store information regarding only the unique attribute of the product, service or item to which that particular field identifier corresponds. For example, a field that holds information about the name of a product is given the field identifier corresponding to product name. Accordingly, all fields having a particular identifier store information and values regarding the same particular attribute of the product, service or item to which the object corresponds. It will thus be appreciated by one of ordinary skill in the art that a database embodying the data structure of the present invention may be adapted to store information relating to various products, services or other items by changing the field identifiers of the database to reflect general attributes of the product, service or item to be stored in the database.

TABLE 1

| Field Identifier | Field Name | Field Description |
|---|---|---|
| 817 | Operating System | The required operating system for software to be compatible with your computer or PDA. Most computers and peripherals are sold with an operating system already installed. |
| 1150 | Hard Drive Capacity | The capacity is the amount of storage space available measured in gigabytes. |
| 1156 | Modem Type | This refers to the type of modem the product is equipped with upon purchase. Internal means it is inside of your product. External means the modem is connected to the outside of your product. PCMCIA modems are used in laptop computers. Cable modems require a cable connection rather than a telephone connection, and cellular modems allow you to connect to the Internet using a cellular phone. |
| 1178 | Processor | The processor is the chip used to drive the computer. The number in the processor's name is how fast the processor has been clocked to perform. A higher number indicates a faster processor. |
| 1217 | Case Style | A cabinet that houses the hard drive, floppy drive, and other inner components of a computer. |
| 1383 | Olympus | NULL |
| 1384 | Athena | |
| 1619 | Speakers Included | These are the type of speakers that come with the product when you purchase it. |
| 1641 | Desktops | Looking to outfit your home or business with a complete computing system, or do you just need to upgrade? Here you will find both stand alone units and complete computing systems - including keyboard and mouse. |
| 2481 | Name | The manufacturer, name and model number of the product. |
| 2488 | Description | Description of the product. |
| 2489 | Image URL | URL for an image of the product. |
| 2492 | Manufacturer ID | The name of the manufacturer that makes the product. |
| 2493 | Model Number | The manufacturer's model number assigned to the product. |
| 2495 | Price | This represents the lowest price available from the vendors selling the product. An 'N/A' in this column indicates that youknowbest currently does not have any vendors that sell this product. |
| 2594 | Notes | The notes section is reserved for in-house, youknowbest use only. Anything someone might need to know about the product that you pick up on can be written here. |

TABLE 1-continued

| Field Identifier | Field Name | Field Description |
|---|---|---|
| 2595 | Datasheet URL | Click on the manufacturer's datasheet URL and it will take you directly to the manufacturers web page with information about the product. |
| 3023 | Desktop Computers | |
| 3221 | Computing | Everything computer-related you need to organize your home, business, and personal life - including computers, laptops, printers, scanners, and more. |
| 3228 | Computer Systems | Here you will find desktops, laptops, and servers to fit all your computing needs, whether you are a first time buyer or a information technology professional. |
| 3423 | Modem (yes/no) | A modem is needed to be able to connect to he internet. Some computing devices are equipped with a modem at purchase and some require an additional purchase in order to connect. |
| 3424 | NIC | A NIC or Network Interface Card is a circuit board/card that is installed and provides capability to connect to a network. |

The types of field identifiers that are available in a database having a data structure of the invention are defined during configuration of the database. The particular field identifiers defined during configuration are based on the general attributes of the products, services, or other items being stored in the database. For each attribute for which information is to be stored in the database, a field identifier is defined. As described above, each field identifier thus defines the type of information that will be stored in a field that is assigned that field identifier. Accordingly, the field identifiers comprise a form of meta information, or "information about information". In the case of the data structure of the invention, each field identifier comprises information about the type of information held in any field that has been given that field identifier, namely the attribute about which that field holds information. Fields comprise information, namely information describing the attribute of the product, service, or other item to which the field identifier corresponds.

It is not necessary that each object in the database include a field corresponding to each of the field identifiers that have been defined for that database. In particular, an object will not have a field corresponding to an attribute of the product, service or other item to which that object relates unless information is known about that attribute. For example, while the weight of certain products may be known, the weight of others may not. The objects corresponding to the products for which there is no weight information will have no field corresponding to the field identifier for product weight. Likewise, an object will not include fields that are not relevant to the product, service or other item to which the object corresponds. For example, a product to which an object corresponds may have no processor. Thus, that object will have no field corresponding to the field identifier for processor speed. Accordingly, the fields in the data structure of each object will depend on the individual attributes of the product, service or item to which the object corresponds and the information known about those attributes. One of ordinary skill in the art will appreciate that the data structure of an object may also include different fields depending on whether the item to which the object corresponds to a product, service, or other item.

A database having the data structure of the present invention supports the retrieval of information from the objects in the database through traditional query methods. For example, all of the fields in each object in the database may be queried to determine if any of the fields in any of the objects in the database contain a particular value. The data structure described by the invention also enables databases embodying the invention to support additional types of query methods based on the fact that each object in the database need not include fields corresponding to each of the field identifiers that have been defined for that database. In particular, it is possible to define various subsets and lists of the objects populating a database of the present invention, wherein each object in the subset or list shares one or more fields that bears a particular field identifier. In such a case, only those objects in the database having the attribute to which the particular field identifier corresponds will be retrieved. For example, only certain objects may have a screen and thus possess the attribute of screen resolution. By querying the database to retrieve those objects that have a field that bears the field identifier for screen resolution, it is possible to return all objects that have a screen resolution, regardless of the other attributes of those objects. One of ordinary skill in the art will appreciate that the objects returned by the query described in the previous sentence may be further queried to return those objects having a screen resolution within a particular range. Likewise, it will be readily appreciated that the subsets of objects sharing one common field identifier need not have all of the same field identifiers and that an object may thus be a member of multiple groups wherein each group is defined by those objects sharing a different field identifier.

In the following description of the present invention, objects stored in a database of the present invention are referred to in terms of the type of product, service or other item to which the object corresponds. In particular, an object corresponding to a product is referred to as "product object"; an object corresponding to a vendor or provider is referred to as a "Vendor object"; and an object corresponding to a list is referred to as a "list object". Likewise, the fields used to store information in each object and the field identifiers used to identify the various types of fields that comprise the data structure of each object are referred to in terms of the attribute to which the field identifier of each field corresponds. For example, a field identifier corresponding to the attribute of product name is referred to as a "product name field identifier" and a field bearing the product name field identifier is referred to as a "product name field". The information regarding a particular attribute of the particular product, service or other item to which an object relates is stored in a field is referred to interchangeably as "information" or a "value".

As noted above, the present invention lends itself to the creation and maintenance of user-defined electronic lists. One of ordinary skill in the art will appreciate that the data structure of the present invention may be adapted to accommodate the storage of information relating to goods, services or other items by defining field identifiers in the database that correspond to the attributes of those goods, services or other items. By way of example, the present invention may be implemented to create a system of databases adapted to create and maintain electronic lists of products, the vendors at which those products are sold, and other information regarding the attributes of those products. A system of databases of the type described in the current example include a product database 12 and a list database. Both the product database and the list database are built using the data structure of the present invention. The product database stores information relating to the products that make up the lists. The information in the product database is stored in the form of product objects and vendor objects. Each product object stores information corresponding to a particular product. The information stored in each product object is specific to the particular product to which the product object corresponds and that will not vary depending on the vendor offering that product for sale. For example, a product object may contain information regarding the name, model number, and manufacturer of the product, or information regarding other attributes of the product such as the weight, speed, and resolution of the product. Table 2 shows an example of the information stored in a product object of the type described in the present example. As shown in Table 2, the information stored by the product object is organized into fields. Each field bears a field identifier corresponding to the attribute to which the information stored in that field relates. The product object contains fields corresponding only to those attributes relevant to the product to which the product object corresponds.

Each vendor object stores information corresponding to a particular version of a particular product being offered by a particular vendor. The information stored in each vendor object is specific to the particular version of the particular product being offered by the particular vendor to which the vendor object corresponds. For example, the vendor object contains a pointer referencing the product object corresponding to the product to which the vendor object corresponds. As noted, this information may be in the form of a pointer which references the relevant product object. Alternatively, the information may be in the form of a copy of the relevant product object itself. The vendor object further includes information relating to the particular vendor that is offering the particular version of the product for sale. This information may take the form of a pointer or reference to a separate file, either in the product database as the vendor item or in a separate database, containing information regarding the vendor. Such information may include, for example, the name and location of the particular vendor. Alternatively, the information regarding the particular vendor may be contained in the vendor object itself. The vendor object also includes other information relating to the other attributes of the particular version of the product to which the vendor object relates. For example, the vendor object may store information relating to the price, color, and quantity of the particular version of the product offered by the vendor to which the vendor object corresponds. Table 3 shows an example of the information stored in vendor objects of the type described in the present example. As shown in Table 3, the information stored by the vendor objects is organized into fields. Each field bears a field identifier corresponding to the attribute to which the informa

TABLE 2

| Product Object | Field Identifier | Attribute | Information/Value |
|---|---|---|---|
| 21987 | 2414 | Manufacturer | Compaq |
| | 2481 | Name | Compaq iPaq |
| | 2488 | Description | This uniquely designed product is ideal for corporate network environments and for employees who primarily use their PC for mainstream office productivity applications and corporate Internet/Intranet access. |
| | 2489 | Image URL | http://www.warehouse.com/MecaImages/www/prodimage_standard/I77822.jpg |
| | 2492 | Manufacturer ID | 14 |
| | 2493 | Model Number | 470018-160 |
| | 2495 | Price | 459.97 |
| | 3365 | Q/A Status | Accepted |
| | 3423 | Modem (yes/no) | No |
| | 3424 | NIC | No |
| | 2594 | Notes | kh 12/7 cleanup |
| | 2595 | Datasheet URL | http://www5.compaq.com/products/Internetdevices/Models/iPAQ_175756_003.html |
| | 2493 | Model Number | 175756-003 |
| | 817 | Operating System | Windows 2000 |
| | 474 | Display Size Inches | None |
| | 542 | Base Memory | 128 |
| | 1150 | Hard Drive Capacity | 8.4 |
| | 1156 | Modem Type | None |
| | 1178 | Processor | P3-500 MHz |
| | 1217 | Case Style | Mini Tower |
| | 1619 | Speakers Included | Integrated Speakers |
| | 2334 | RateItAll.com Ratings | 1.0 |
| | 2344 | ConsumerReview.com Ratings | 5.0 | tion stored in that field relates. The vendor objects contain fields corresponding only to those attributes relevant to the version of the product and the vendor to which the vendor object corresponds.

TABLE 3

| Vendor Item | Field Identifier | Attribute | Value |
|---|---|---|---|
| 9325871 | 2482 | Product Object | 21987 |
| | 2481 | Name | Compaq iPAQ C/800 20 GB 64 MB NIC Win98 |
| | 2483 | Availability | −1 |
| | 2484 | Buy URL | http://www2.warehouse.com/product.asp?pf%5Fid = CP18060&blind = no&cat = pc |
| | 2485 | Category Hint | pc |
| | 2489 | Image URL | http://www2.warehouse.com/MecaImages/www/prodimage_standard/177822.jpg |
| | 2491 | Manufacturer | Compaq Commercial |
| | 2492 | Manufacturer ID | 14 |
| | 2493 | Model Number | 470018-160 |
| | 2495 | Price | 579 |
| | 2498 | Vendor SKU | CP18060 |
| | 2499 | Last Feed Date | 1008186673 |
| | 3313 | Resolved Buy URL | http://www2.warehouse.com/product.asp?pf_id = CP18060&blind = no&cat = pc |
| | 6359 | Additional Information | Audio Output: Sound card - PCI - 16-Bit 48 KHz stereo Dimensions (W × D × H): 5.4 in × 10.3 in × 13.6 in Form Factor: 168-PIN - non-parity - Storage Hard Drive: 1 × 20 GB internal |
| . | . | . | . |
| . | . | . | . |
| . | . | . | . |
| 9336738 | 2480 | Product Object | 21987 |
| | 2481 | Name | Compaq iPaq |
| | 2483 | Availability | −1 |
| | 2484 | Buy URL | http://www.cdw.com/shop/products/default.asp?EDC = 316787 |
| | 2488 | Description | This uniquely designed product is ideal for corporate network environments |
| | 2489 | Image URL | http://webobjects.cdw.com/staticimg/full/3/1/6787.jpg |
| | 2491 | Manufacturer | Compaq Computer |
| | 2492 | Manufacturer ID | 14 |
| | 2493 | Model Number | 470018-160 |
| | 2495 | Price | 599.86 |
| | 2498 | Vendor SKU | 316787 |
| | 2499 | Last Feed Date | 1008186670 |
| | 3313 | Resolved Buy URL | http://www.cdw.com/shop/products/default.asp?EDC = 316787 |
| | 6359 | Additional Information | Connectivity Serial port: 1 Parallel port: 1 Video port: 1 Mouse port: 1 USB port: 2 10/100 Mbps Ethernet port: 1 Keyboard port: 1 NIC information: 10/100 Ethernet Additional information: |
| . | . | . | . |
| . | . | . | . |
| . | . | . | . |
| 9424808 | 2482 | Product Object | 21987 |
| | 2481 | Name | Compaq Ipaq Legacy Cel 800 MHz |
| | 2483 | Availability | 232 |
| | 2484 | Buy URL | http://www.insight.com/web/apps/productpresentation/index.php?product_id = 470018-160 |
| | 2488 | Description | The Compaq iPAQ desktop is ideal for corporate network environments and employees who primarily use their PC for mainstream office productivity applications and corporate Internet/intranet access. |
| | 2489 | Image URL | http://www.insight.com/graphics/us/products/mn/470018-160_mn.jpg |
| | 2493 | Model Number | 470018-160 |
| | 2495 | Price | 579.99 |
| | 2498 | Vendor SKU | 470018-160 |
| | 2499 | Last Feed Date | 1008186670 |
| | 3313 | Resolved Buy URL | http://www.insight.com/web/apps/productpresentation/index.php?product_id = 470018-160 |

TABLE 3-continued

| Vendor Item | Field Identifier | Attribute | Value |
|---|---|---|---|
| | 6359 | Additional Information | >> Intel Celeron 800 Mhz Processor >> 64 MB SDRAM; 20 GB Hard Drive >> Integrated Audio and NIC >> Microsoft Windows 98 |

Based on the foregoing description, it will be appreciated by one of ordinary skill in the art that the product database of the present example contains one product object corresponding to each product for which information is stored in the product database. However, the database may contain multiple vendor objects corresponding to each product. In particular, for any given product object in the database there may be multiple vendors offering for sale the product to which that product object corresponds. Likewise, each vendor offering that product for sale may offer multiple versions of the product at different prices. Accordingly, to capture this information, the database will contain a vendor object corresponding to each version of the product being offered by each vendor offering that product for sale.

The list database 13 of the present example stores information relating to lists of products for which there are product objects in the product database. The lists are stored in the list database in the form of list objects. Each list object stores information corresponding to a particular list of product objects in the product database. For example, a list object may contain information regarding the user who created the list, a unique name for the list, and a password used to access the list. Each list object further stores information relating to the product objects in the product database that corresponds to the products on the list. The information relating to each product object that corresponds to a product on the list takes the form of a pointer referencing a product object in the product database that correspond to products on the list. However, it will be appreciated that the information relating to each product object that corresponds to a product on the list may also take the form of a copy of the product object itself. Table 4 shows two tables exemplifying the storage of information on the list database. As shown in Table 4, information regarding the lists stored in the list database may be organized into a table of fields in which each list is identified by a user identifier indicating the user who generated the list, a list identifier indicating the list itself, and a list name identifier indicating the name given to the list by the user. In addition, Table 4 shows a depiction of the information stored in a list object of the type described in the present example. The information stored by the list objects is organized into fields. Each field bears field identifiers. As shown in Table 4, a list object includes a user identifier field containing the user identifier given to the user who generated the list, a list identifier field containing a list identifier identifying the particular list itself, and a product identifier field holding pointers of references to the product identifiers of the product in the product database that are on the list. The list object may also contain fields corresponding to other attributes of the products on the list, such as the position on the list held by a particular product and the source from which the information regarding the product stored in the product database was obtained.

TABLE 4

| User Identifier | List Identifier | List Name Identifier |
|---|---|---|
| 54841 | 845 | Products |
| | 946 | Christmas Gifts |
| | 1023 | Wish List |
| . | . | . |
| . | . | . |
| . | . | . |
| 55871 | 342 | Services |
| | 563 | Gifts |
| | 673 | Birthday |

| User Identifier | List Identifier | Product Identifier | List Position Identifier | Source Identifier |
|---|---|---|---|---|
| 54841 | 845 | 12346 | 1 | |
| | 845 | 12345 | 2 | |
| | 845 | 12342 | 3 | |
| | 845 | 23423 | 10 | |

Each list created by the present invention thus defines a subset of product objects in the product database that are pointed to by the list object corresponding to that list. Likewise, other lists generated by the present invention define other subsets of the product objects in the product database that are pointed to by the list objects corresponding to those lists. Thus, in practice, a list is generated by creating a new list object in the list database and providing that list object with information in the form of pointers that refer or point to those product objects in the product database that correspond to the products that are to be added to the list. Likewise, a desired list is retrieved from the list database by querying the list database to retrieve those lists that have a given value in the field that bears the field identifier corresponding to the list name. It will be appreciated by one of ordinary skill in the art that the present invention teaches that each product object may be a member of multiple lists, and that, regardless of the number of lists that contain a given product object, the database need only contain a single copy of that given product object. Accordingly, it will be further appreciated that by updating the information in a single product object in the product database, each of the electronic lists that point to that product are likewise updated.

As noted above, the present invention is well-suited to the creation and maintenance of user defined lists of products. Referring to FIG. 1, what follows below is a description of an embodiment of the present invention in which the item database described in the example above comprises a product database 12 and the list database described in the example above comprises a list database 13 (see Table 4). The product database 12 is a database having a data structure of the type described above, populated by product objects and vendor objects. Each product object contains information corresponding to a unique product. Each vendor object contains information corresponding to a particular version of a product offered by a particular vendor or provider. List database 13 is a database having a data structure of the type described above, populated by list objects. While the following description is based on an embodiment of the present invention comprising a product database populated by product objects and vendor objects, it will be appreciated by one of ordinary skill in the art that the present invention may also embody a service database populated by service objects, or a mixed database populated by both product objects and service objects. Thus, in the most general description of the invention we refer to the database 12 and an item database. In any of these cases, the present invention is equally effective in creating and maintaining lists including products, services, or both products and services, respectively. Likewise, it will further be appreciated that while the functions of the product database and list database are described as being carried out on two separate databases, each embodying the data structure of the present invention, in alternative embodiments, the functions of the product database and list database may be carried out on the same database, or on multiple product databases and multiple list databases.

The embodiment of the present invention described below is configured to operate under a client/server computing model and, in particular, to operate on the system shown in FIG. 1. The system shown in FIG. 1 includes a server computer system 10, located at a node on a communications network 20. The system further includes any number of client computer systems 30, each located at a node on communications network 20, and product provider computer systems 80, also located at nodes on communications network 20. Communication is supported between and amongst the nodes on communications network 20, and thus between server computer systems 10, client computer systems 30, and provider computer systems 80, through a series of communications links 22. Communications links 22 of the present invention may be accomplished by either terrestrial, wireless, or satellite means, provided that communications link 22 is capable of sustaining electronic communications between the nodes connected by communications link 22. FIG. 1 also shows product database 12 residing on server computer system 10. Accordingly, it will be understood that product database 12 is in electronic communication with client computer systems 30 and provider computer systems 80 via communications network 20.

As shown in FIG. 1, communications network 20 of the system on which the present invention may operate includes the world wide web portion of the Internet (referred to herein interchangeably as the "Internet" or the "Web"). However, it will alternatively be appreciated that communications network 20 may include any other local area network, wide area network, or communications network capable of supporting electronic communications between two or more nodes. In the interest of simplifying the description of the present invention, FIG. 1 depicts a system including several client computer systems 30 and several product provider computer systems 80. However, it will be understood that the present invention may be implemented to operate on a communications network 20 having additional client computer systems 30 and additional product provider computer systems 80, each operating under the principles described herein with respect to client computer systems 30 and product provider computer systems 80 shown in FIG. 1. Likewise, while server computer system 10 is shown in FIG. 1 as being located at a single node on communications network 20, it will be understood that the present invention also lends itself to the use of a server computer system 10 distributed over two or more nodes on communications network 20.

Server computer system 10 of the system shown in FIG. 1 includes a computer server capable of serving information to one or more nodes on communications network 20 defined by the Internet. Client computer system 30 of the system on which the present invention is intended to operate includes a personal computer, network terminal, personal digital assistant, telephone, or other electronic device capable of being operably attached to and communicating over the communications network 20. Each product provider computer system 80 is a node on communications network 20 through which vendors and manufacturers of products offer various products for sale, or through which information regarding products is made available. As such, in the case that communications network 20 is the Internet, each product provider computer system 80 embodies a Web page displaying products offered for sale and providing various information regarding those products. In each case, it will be readily understood by one of ordinary skill in the art that the exact specifications of communications network 20, server computer system 10, and each client computer system 30 and product provider computer system 80 of the system on which the present invention is intended to operate will depend on factors such as the number of nodes on communications network 20, the amount of information being communicated across communications network 20, and the desired speed of operation of the present invention.

Figure 2:
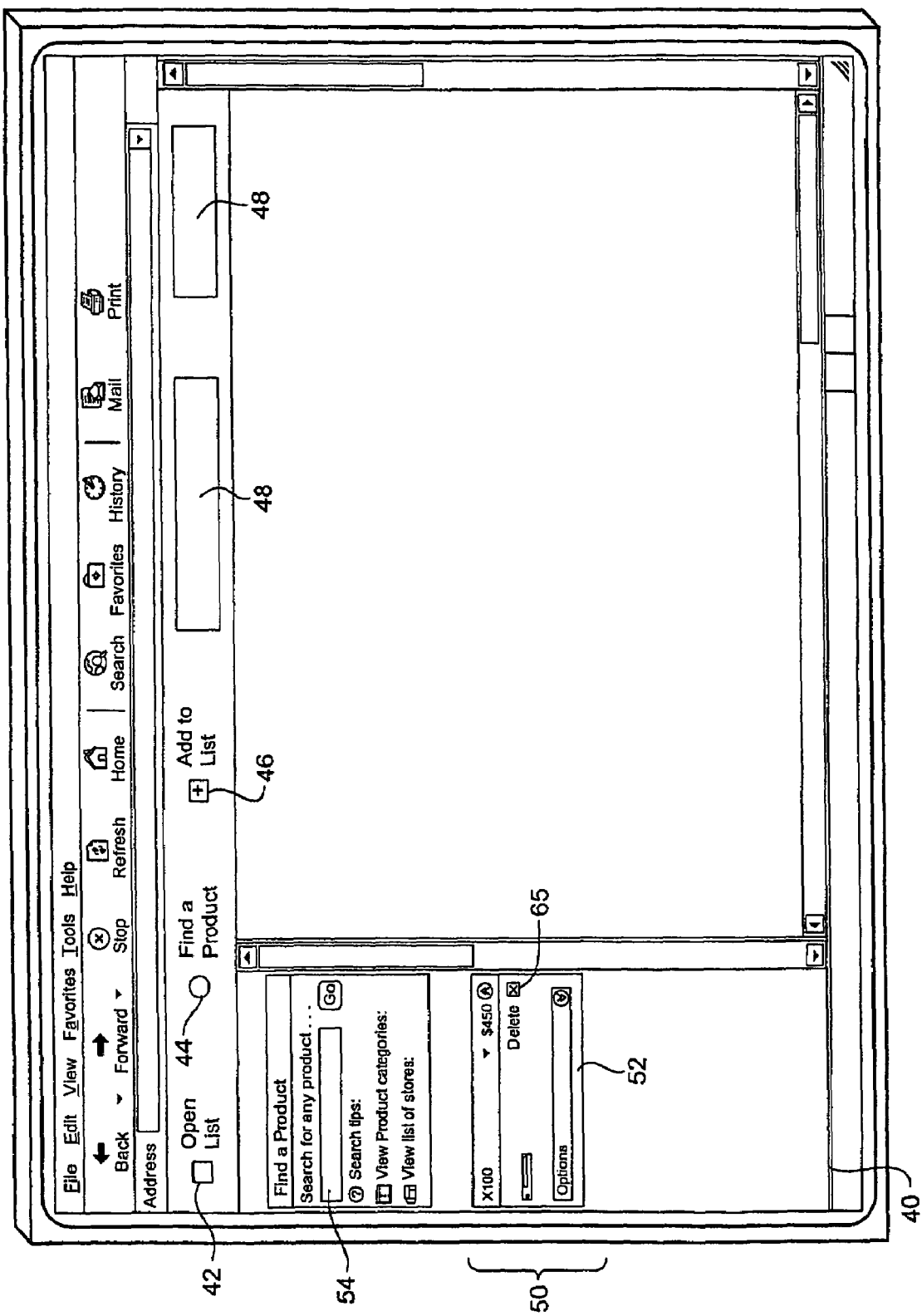
FIG. 2 is an exemplary view of a computer screen depicting the operation of the user interface of the management tool in an embodiment of present invention.

The embodiment of the present invention implemented to operate on the system shown in FIG. 1 includes a management tool with which user-defined lists of products may be created and maintained. The management tool is implemented as a sequence of operations, steps or modules implemented in the form of client-side computer software on client computer system 30. Accordingly, the management tool is capable of sustaining communications with server computer system 10 and, in particular, sending commands and instructions to server computer system 10 and receiving the results of those commands and instructions from server computer system 10. Referring to FIG. 2, the management tool includes a user interface 40 used to display information regarding the operation of the management tool on display 32 of client computer system 30. As shown in FIG. 2, user interface 40 preferably takes the form of a tool bar on an Internet browser computer software program and includes a series of computer software-implemented buttons for use in providing instructions and commands to the management tool. It will be appreciated that user interface 40 may also take the form of a computer software program that is separate and independent from any Internet browser computer software program. As used herein, the term "Internet browser" is intended to mean one of the generally available computer software programs that is used to navigate, access and view the web sites on the Internet. It is well understood that an Internet browser will take different embodiments depending on the specifications of client computer system 30 and display 32 on which the Internet browser has been implemented. Likewise, user interface 40 of the management tool will take different embodiments depending on client computer system 30 and display 32 on which user interface 40 is implemented.

As noted above, the management tool includes a series of computer software-implemented buttons used to issue commands to the management tool to perform certain operations on the list database and product database. In particular, the embodiment of user interface 40 depicted in FIG. 2 includes a new list button 41, open button 42, find button 44, and add button 46. It will be appreciated by one of ordinary skill in the art that while the embodiment shown in FIG. 1 includes the aforementioned buttons, alternative embodiments of the management tool may include additional buttons providing for other operations to be performed on the list database and the product database, and the list objects, product objects, and vendor objects contained therein. New list button 41 is used to issue a command to the management tool to create a new list in list database 13. Open button 42 is used to issue a command to the management tool to retrieve a list of product objects from list database 13 and to display that list on user interface 40. Find button 44 is used to issue a command to the management tool to search product database 12 for a product object corresponding to a product having certain characteristics and to display the results of that search on user interface 40. A user utilizes add button 46, preferably by clicking on it, to issue a command to the management tool to add a product object corresponding to the product information displayed in product information field 48 to a list that has already been retrieved to user interface 40. A further description of the operation of user interface, and the buttons and fields displayed thereon, follows below.

The embodiment of the present invention described herein teaches that a list may be created by providing the management tool with the information necessary to create a new list and instructing the management tool to establish a new list by selecting new list button 41. The information necessary to establish a new list includes a list name or code by which the list will be identified. The list name or code may include, for example, a user name and password. In the present embodiment of the invention, the list name or code is provided to the management tool and new list button 41 is selected. Responsive to such command, the management tool instructs list database 13 to create a new list object and to create a field in the new list object to store the list name or code provided to the management tool. It will be understood from the foregoing description that the field identifier given to the field storing the list name or code is the same field identifier that is given to the field in all other list objects that stores the name or code for those list objects. Once created, the list may be updated and managed, as is described in greater detail below. A previously created list may be accessed from any client computer system 30 on communications network 40 by entering the unique list identifier associated with the list into the management tool. In practice, a list identifier is entered into a data field on user interface 40. The management tool transmits a query to list database 41 to identify and retrieve to the management tool those list objects having a list identifier corresponding to the list identifier entered into user interface 40. As shown in FIG. 2, upon retrieval of the list objects corresponding to the entered list identifier, the product database is queried to obtain information regarding each of the product objects pointed to by the list object and the management tool generates a graphical representation of list 50 including graphical representations of each of product objects 52 pointed to by the list object. The information stored in the vendor objects that refer to each of the product objects pointed to by the list object may then be accessed by selecting any of the graphical representations of product objects 52 displayed in the graphical representation of list 50. In an alternative embodiment of the invention, the graphical representation of list 50 may itself include a graphical representation of the vendor objects that refer to each of the product objects pointed to by the list object. As will be described below, the list that is currently being displayed on user interface 40 may be managed. Management of the list may include, for example, making additions to or subtractions from the list. The list that is currently being displayed on user interface 40 will be referred to herein as the "current list." As the foregoing description indicates, the present embodiment of the invention teaches that the product objects and vendor objects comprising a list are retrieved from product database 12 on server computer system 10 to the management tool on client computer system 30. As a result, it will be appreciated that each list created by the present invention is a universal list insofar as the product objects and vendor objects comprising the list may be retrieved from server computer system 10 to a management tool resident on any client computer system 30 on communications network 20, regardless of where the list was originally created or accessed in the past.

Figure 3:
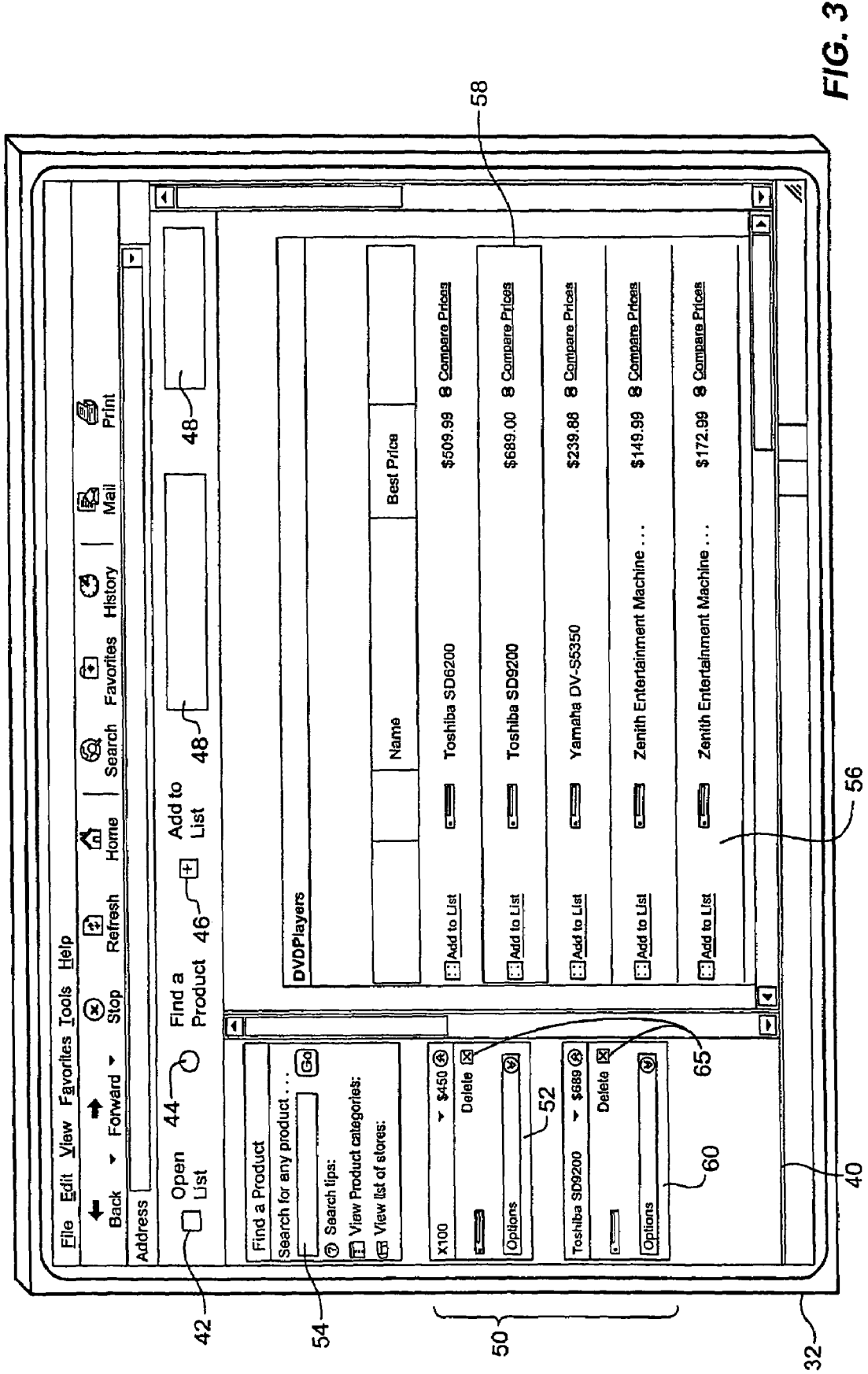
FIG. 3 is another view of the computer screen of FIG. 2 showing the display of items from the item database of FIG. 1.

A product may be added to the current list by locating a product object corresponding to that product in product database 12 and adding a pointer referring to that product object to the list object corresponding to the current list. As shown in FIG. 3, user interface 40 of the management tool includes a search field 54. In practice, a description of a product is entered into search field 54 and find button 44 is selected. A query command is issued by the management tool to product database 12. Responsive to the query command, product database 12 retrieves to the management tool all product objects having fields that contain information corresponding to the description entered into search field 54. A graphical representation of the retrieved product objects is generated and displayed in the form of a list 56 on user interface 40. A desired product 58 from list 56 may be added to the current list by identifying a desired product 58 to be added to the current list and selecting add button 46. Responsive to such command, the management tool instructs the list database to add to the list object corresponding to current list a pointer referring to the product object that corresponds to desired product 58 and, as shown in FIG. 3, add a graphical representation 60 of the product object corresponding to desired product 58 to the graphical representation of current list 50.

Figure 4:
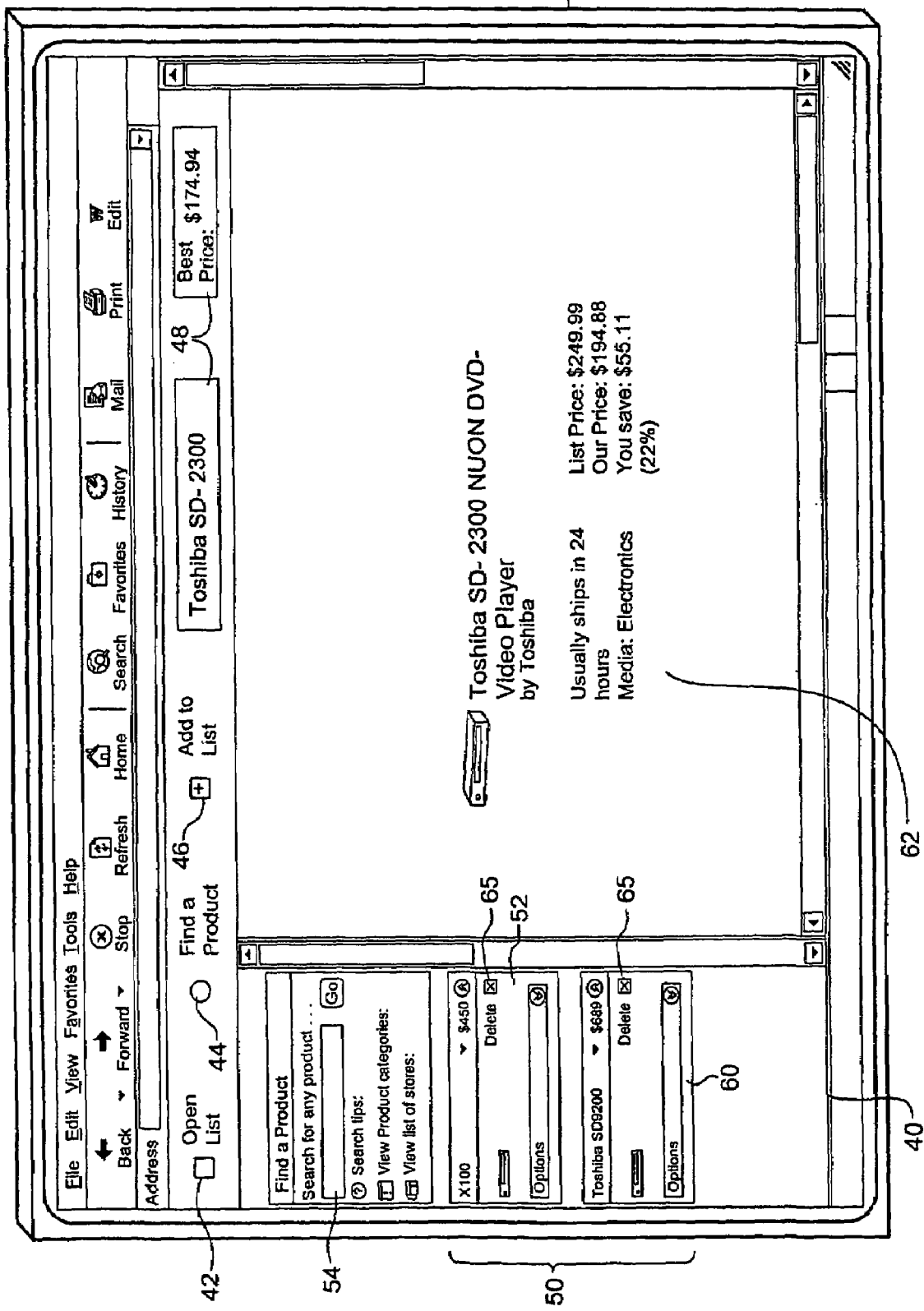
FIG. 4 is yet another view of the computer screen of FIG. 2 after the connection to a provider web site.

The present invention also teaches that a product may be added to a current list by detecting and capturing information regarding that product from a provider computer system 80. As shown in FIG. 4, upon locating a product provider computer system 80 that includes a display of information 62 regarding a particular product, the management tool detects and captures the display of information 62 regarding the product on provider computer system 80. Based on the detected and captured information, the management tool queries product database 12 to determine if product database 12 includes a product object corresponding to the product for which information 62 has been detected and captured, and a vendor object corresponding to the vendor and version of the product for which information 62 has been detected and captured. If product database 12 does not include a product object or a vendor object corresponding to the product for which information 62 has been detected and captured, a new product object corresponding to the product for which information 62 has been detected and captured, and a new vendor object corresponding to the vendor of the product and the version of the product for which information 62 has been detected and captured, are created using information 62. If product database 12 includes a product object corresponding to the product for which information 62 has been detected and captured, but does not include a vendor object corresponding to the version of the product and the vendor offering the product, a new vendor object corresponding to the vendor of the product and the version of the product is created. As will be appreciated from this description, information 62 that has been the management tool all product objects having fields that contain information corresponding to the description entered into search field 54. A graphical representation of the retrieved product objects is generated and displayed in the form of a list 56 on user interface 40. A desired product 58 from list 56 may be added to the current list by identifying a desired product 58 to be added to the current list and selecting add button 46. Responsive to such command, the management tool instructs the list database to add to the list object corresponding to current list a pointer referring to the product object that corresponds to desired product 58 and, as shown in FIG. 3, add a graphical representation 60 of the product object corresponding to desired product 58 to the graphical representation of current list 50.

The present invention also teaches that a product may be added to a current list by detecting and capturing information regarding that product from a provider computer system 80. As shown in FIG. 4, upon locating a product provider computer system 80 that includes a display of information 62 regarding a particular product, the management tool detects and captures the display of information 62 regarding the product on provider computer system 80. Based on the detected and captured information, the management tool queries product database 12 to determine if product database 12 includes a product object corresponding to the product for which information 62 has been detected and captured, and a vendor object corresponding to the vendor and version of the product for which information 62 has been detected and captured. If product database 12 does not include a product object or a vendor object corresponding to the product for which information 62 has been detected and captured, a new product object corresponding to the product for which information 62 has been detected and captured, and a new vendor object corresponding to the vendor of the product and the version of the product for which information 62 has been detected and captured, are created using information 62. If product database 12 includes a product object corresponding to the product for which information 62 has been detected and captured, but does not include a vendor object corresponding to the version of the product and the vendor offering the product, a new vendor object corresponding to the vendor of the product and the version of the product is created. As will be appreciated from this description, information 62 that has been detected and captured is categorized and associated with an attribute for which a field has been created in the product database and stored in the field corresponding to that attribute in either the product object or vendor object. As will be described in greater detail below, the present embodiment of the invention accommodates the verification of information 62 prior to the creation of the product object and vendor object.

Figure 5:
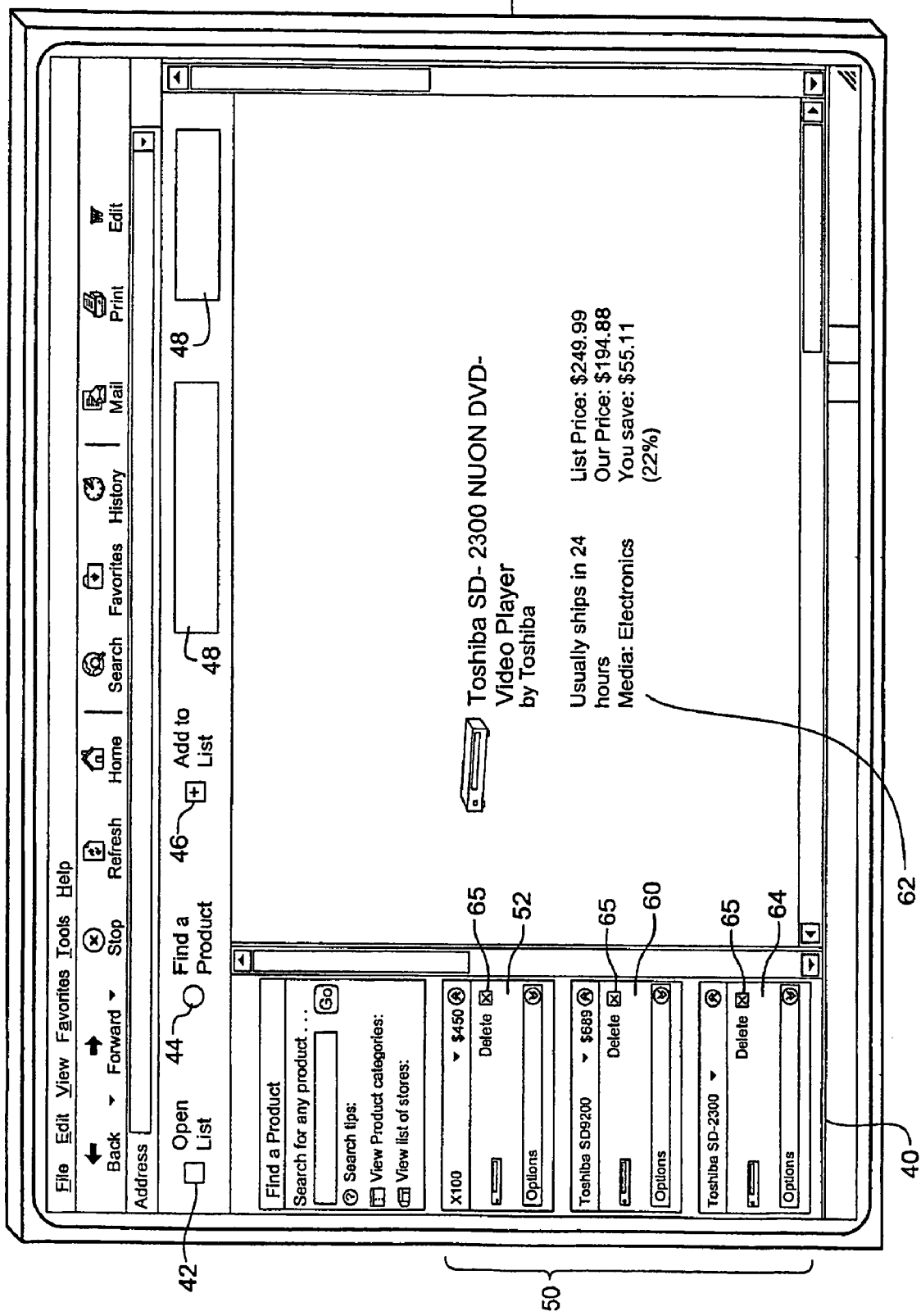
FIG. 5 is a further view of the computer screen of FIG. 2 illustrating the capture of information from the provider web site.

If product database 12 contains an existing product object and vendor object corresponding to the product for which information 62 has been detected and captured, information 62 contained in the existing product object and vendor object is compared against the detected and captured information 62. If the detected and captured information 62 is not present in the product object and vendor object, the detected and captured information 62 is verified and, pending verification, the product object and vendor object is updated to include the detected and captured information 62. If the detected and captured information 62 is present in the product object and the vendor object, the product object and vendor object are not modified. In either case, the management tool then displays the information from the new, updated, or existing product object, as applicable, in product information field 48. The product for which information 62 has been detected and captured may be added to the current list by selecting add button 46. Responsive to such command, the management tool adds a pointer to the product object or vendor object corresponding to the information displayed in product information field 48 to the list object corresponding to the current list and, as shown in FIG. 5, adds a graphical representation 64 of the product object corresponding to the information displayed in product information field 48 to the graphical representation of list 50 on user interface 12.

As noted above, the present embodiment of the invention teaches that information 62 regarding a product that is detected and captured from a provider computer system 80 may be verified prior to being incorporated into either a new or existing product object or vendor object. The step of verification may include a comparison of the detected and captured information 62 against existing records to determine if the detected and captured information 62 corresponds in form and range to existing information for similar products. The step of verification may also include comparison against records provided by a manufacturer or vendor of a product to determine if the detected and captured information 62 corresponds with the existing records. Verification may include a manual verification by a system operator. By way of example, the model numbers and serial numbers used by a particular manufacturer generally will follow a format unique to that manufacturer. Thus, a form of verification may include checking the model and serial number found in the detected and captured information 62 against the format of the model and serial number used by the manufacturer of the product corresponding to the detected and captured information 62. By way of further example, verification may include checking the model number found in the detected and captured information 62 against the product objects in product database 12 that have the same model number to determine if other information found in the detected and captured information 62 (such as the product name and manufacturer) matches the equivalent information found in the product objects having the same model number. Still another example of verification may include checking the price found in the detected and captured information 62 to determine if it falls within a reasonable range of the prices for the product to which the detected and captured information 62 corresponds.

It is noted above that the present embodiment of the invention teaches that, in performing the step of comparing the product objects and vendor objects in product database 12 against the detected and captured information 62, the management tool updates the product object corresponding to the product, and the vendor object corresponding to the vendor and version of the product, to include the captured and detected information 62. The process of updating the product and vendor objects generally includes adding information to the product and vendor objects that is not yet included in the product and vendor objects or adding information to the product and vendor objects that is more current or more desirable than the existing information in the existing product and vendor object. By way of example, if information 62 detected and captured from provider computer system 80 includes a price for the product that is lower (and thus more desirable) than the price then included in the vendor object, pending verification (as discussed above), the vendor object will be updated to reflect the lower price and the vendor offering that lower price. Likewise, if information 62 detected and captured from provider computer system 80 includes a price for the product that is higher (and thus less desirable) than the price then included in the vendor object, pending verification, the vendor object will not be updated to reflect the higher price. In either case, the information regarding the product displayed in product information field 48 will reflect the lower of the captured and detected price and the price included in the vendor object. Accordingly, by way of further example, and as shown in FIG. 5, while information 62 detected and captured from product provider computer system 80 reflects a price of $194.88 for the product, the information displayed in product information field 48 reflects a lower price of $174.94 that had been included in the vendor object for that product.

The present invention further teaches that a product may be added to a list by manually entering information regarding that product into the management tool. In the case of manual entry, information regarding a product is entered into product information field 48, and add button 46 is selected. Responsive to this command, the management tool captures the manually entered information from product information field 48, creates a new product object and a new vendor object corresponding to the product corresponding to the manually entered product information, and revises product database 12 to include that new product object and vendor object.

Products may also be deleted from a list by selecting the graphical representation of the product object to be deleted from the graphical representation of list 50 and selecting delete button 65. Responsive to this command, the management tool removes the pointer to the selected product object from the list object corresponding to the current list, thus removing the product from the current list. It will be appreciated that by deleting a product from a list, the product object corresponding to that product is not also deleted from product database 12, and that the product object will remain listed on any other user-defined lists that contain a pointer referencing that product object.

One of ordinary skill in the art will understand that references made herein to "identifying", "selecting", or "activating" a button on a computer screen are intended to refer to the act of issuing a command to the computer to choose and enact the computer-implemented set of commands associated with that button. Such acts are commonly accomplished by positioning a pointer above the button and depressing one or more of the buttons on a mouse device, by tapping on the button with a stylus device, or by any other conventionally known process or operation generally known in the art.

As is noted above, each user-defined list generated by the present invention is a list of pointers or references to product objects in product database 12 wherein each product object corresponds to a particular product and includes fields containing information regarding that product. Likewise, each product object is referenced by one or more vendor objects in product database 12 wherein each vendor object corresponds to a particular version of the product being offered by a particular vendor. Given that the information included in the product objects pointed to in each list, and the vendor objects referencing those product objects, are subject to periodic updates as described above, it should be understood that each time that a list is accessed, the information retrieved from the product objects pointed to by that list, and the vendor objects referenced by those product objects, will reflect any updates that have been made to that information in the interim since that list was last accessed. Put another way, by updating a single product object to include new information, all lists that contain pointers to that product object are thereby updated to include the new information. By way of example, if a product object pointed to by a particular list is updated after the pointer to that product object is added to the list (or after that list has been last accessed), the next time the list is accessed, the list will reflect the updated product object, rather than the product object in the form that it existed when it was added to the list (or when the list was last accessed). Accordingly, the present embodiment of the invention provides the benefit of being self-updating through use. In particular, as users create and maintain lists of products, new and updated information is stored in the product database in the form of new product objects and updates to existing product objects, as is described in detail above. As new product objects and updates to existing product objects are stored in the product database, the lists referencing those product objects are automatically updated to include such new information. Accordingly, the present invention provides the benefit of supporting the generation and maintenance of lists that are automatically updated as the product objects and vendor objects in the product database are updated.

In addition to new and updated information being provided to product database 12 through users of the database, product database 12 may also be populated with new and updated product objects received directly from vendors and manufacturers of products. In such an embodiment, a file containing product information may be received from a vendor or manufacturer and the product information directly input into product database 12. Alternatively, a communications link may be established between computer systems operated by the vendors and manufacturers of products and product database 12. Such communications link may take the form of communications network 20, or any other generally accepted form of electronic communication. Once such a link is established, updated product information from those vendors and manufacturers may be sent directly to product database 12. In either case, it will be appreciated that the vendors and manufacturers of products may be able to provide information relating to the products that is not generally available for detection and capture from provider sites 80. For example, while a provider site 80 may not include information pertaining to the existing inventory and availability of a product offered for sale on provider site 80, the vendor or manufacturer may, in addition to the attributes noted above, provide real-time, up-to-date information relating to existing inventory and availability of their products.

While the embodiment of the present invention shown in the figures and described above includes product database 12 and list database 13 as resident on server computer system 10, in an alternate embodiment, the management tool of the present invention includes a database on client computer system 30 for storing copies of the lists accessed through that client computer system 30. It will be appreciated that, by maintaining a database of the lists accessed through a client computer system 30 on that client computer system 30, such lists may be accessed from the copy on client computer system 30 rather than from product database 12. Accordingly, it will be appreciated that such an embodiment allows for the list to be accessed when client computer system 30 is not in communication with server computer system 10 via communications network 20. In such an embodiment, upon accessing list database 13 to retrieve a list, the management tool will execute the additional step of checking for differences between the copy of the list maintained on client computer system 10 and the list retrieved from list database 13. In the event that differences are detected, the management tool will synchronize the record of the list on the client computer system with the list retrieved from list database 13.

Figure 6:
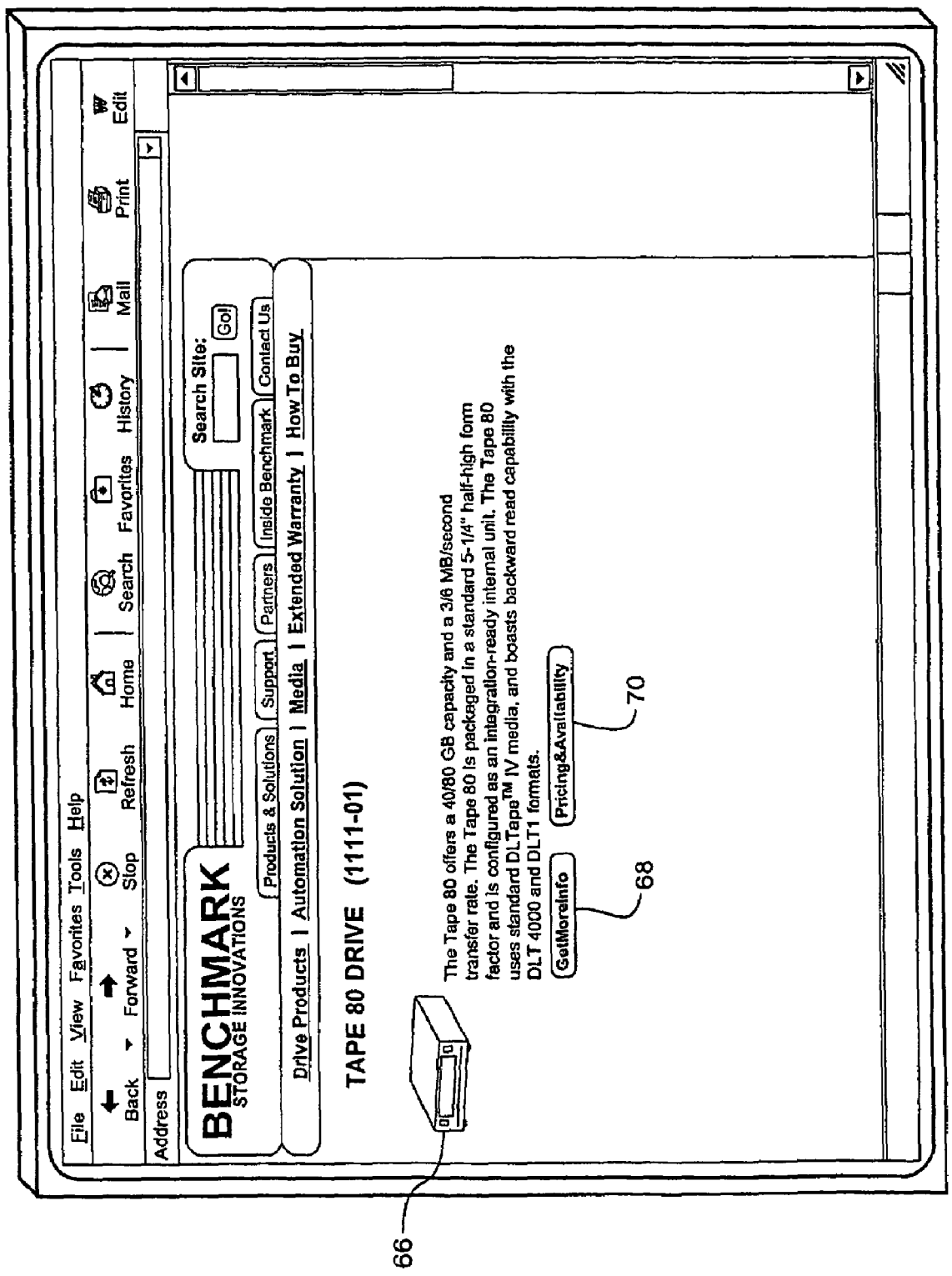

In addition to providing a tool with which consumers may create and maintain lists of products and services, as described above, the present invention also lends itself to the generation of manufacturer-defined lists of vendors who offer that manufacturer's products for sale. In particular, a product manufacturer may maintain a web site on which the manufacturer displays information regarding its products. As shown in FIG. 6, such a web site may include a display of information 66 regarding a product produced by that manufacturer and a hyperlink button 68 to further information regarding the product. However, unless the manufacturer has established a relationship with a vendor of its products, or unless the manufacturer has established a means to offer its own products for sale on its web site, a potential customer visiting the web site will be required to leave the manufacturer's web site and locate the web site of a vendor of that manufacturer's products before being able to purchase the products displayed on the manufacturer's web site. The present invention may be used to provide such a manufacturer with the ability to offer a list of updated information on its web site regarding the vendors that offer its products for sale, and with the ability to facilitate a direct link from the manufacturer's web site to web sites maintained by such vendors where the manufacturer's products may be purchased online.

As shown in FIG. 6, under this aspect of the present invention, the manufacturer's web site has been equipped with a button 70 linking the display of information 66 to a separate Web page including information regarding the pricing and availability of product described in information 66. By selecting the pricing and availability button 70, the manufacturer's web site queries product database 12 to retrieve the product object in product database 12 that corresponds to the product for which information 66 is displayed on the manufacturer's web site, and the vendor objects referencing that product object. Referring to FIG. 7, product database 12 generates a graphical representation 72 of the product object for the product to which information 66 corresponds, and the vendor objects referencing that product object. Graphical representation 72 may include any of the information that is stored in the fields of the product object and the vendor object. In the embodiment shown in FIG. 7, graphical representation 72 includes information regarding the pricing and availability of the product and hyperlinks to the web sites maintained by the vendors at which the product is offered for sale. By selecting one or more of the hyperlinks, a user of the manufacturer's web site may link directly to a web site maintained by a vendor of the products produced by that manufacturer without leaving the web site of the manufacturer.

As noted above, the list generated on the manufacturer's web site by the present invention is a manufacturer-defined list. Accordingly, the present invention teaches that the manufacturer may select what portion of the information stored in the fields of the product object and vendor object is to be displayed in graphical representation 72. For example, the manufacturer operating the web site shown in FIG. 7 has chosen that graphical representation 72 include information on price and availability of the product for Vendors A-C. However, it should be appreciated that the information actually stored in the product object may include additional information regarding the product, and the information stored in the vendor objects referencing that product object may include information regarding additional vendors of that product, and that the manufacturer may have chosen to selectively suppress such additional information from graphical representation 72. By way of example, the manufacturer may have instead elected to suppress the display of certain vendor identifiers that correspond to vendors that are not preferred vendors of the manufacturer. Likewise, the manufacturer may have elected to display only certain information regarding the product, while suppressing other information from graphical representation 72.

Accordingly, there has been described herein a new and novel database and method of operation to facilitate the generation and maintenance of lists of information contained in the database. It should be understood that the particular embodiments shown in the drawings and described within this specification are for purposes of example and should not be construed to limit the invention which will be described in the claims below. Further, it is evident that those skilled in the art may now make numerous uses and modifications of the specific embodiments described, without departing from the inventive concepts. It is also evident that the steps recited may in some instances be performed in a different order; or equivalent structures and processes may be substituted for the various structures and processes described.

We claim:

1. A method for configuring a database system to store information regarding a plurality of items for purchase in electronic commerce, said method comprising:
   establishing a database on a computer system;
   establishing within said database a first product object corresponding to a first item of the plurality of items;
   generating within said first product object a plurality of product object fields;
   associating a product object field identifier with each product object field of said plurality of product object fields;
   capturing information related to a second item;
   determining, based on querying said database, whether said information related to said second item corresponds said first product object;
   responsive to determining that said information related to said second item corresponds to said first product object, creating, in said database, a vendor object corresponding to said information related to said second item;
   establishing within said vendor object a plurality of vendor object fields; and
   associating said vendor object with said first product object, said database configured, in response to a change to at least one field of said plurality of product object fields of said first product object, to update said vendor object.

2. The method of claim 1, further comprising:
   generating a product object attribute for each one of said plurality of product object fields, said product object attribute describing a type of information stored in a corresponding product object field.

3. The method of claim 2 wherein the vendor object only contains fields relevant to the information related to the second item.

4. The method of claim 1, further comprising:
   generating a vendor object attribute for each one of said plurality of vendor object fields, the vendor object attribute describing a type of information stored in a corresponding vendor object field.

5. The method of claim 1 wherein said first item and said second item are versions of the same product.

6. A method of configuring a database system to store information regarding a plurality of items, the method comprising:
   (a) receiving information related to a first plurality of items;
   (b) providing a template database, storing a plurality of item templates, each of the plurality of item templates corresponding to an information structure;
   (c) determining an information structure for each item of the first plurality of items;
   (d) retrieving a template of the plurality of templates for each item of the first plurality of items based on the information structure of each item of the first plurality of items;
   (e) applying the template related to each item to parse the information related to each item; and
   (f) capturing the parsed information.

7. The method of claim 6 wherein the capturing of (f) includes:
 i) creating an object for each of the first plurality of items wherein each item of the plurality has at least one attribute; and
 ii) creating a field for each of at least one attribute of each item of the plurality.

8. The method of claim 7 wherein each field has an associated field identifier.

9. The method of claim 8 wherein each field identifier defines the type of information to be stored within a field associated with the field identifier.

10. The method of claim 8 wherein the capturing of (f) includes:
 iii) generating within a first object at least one object field;
 iv) associating an object field identifier with each said object field;
 v) defining at least one attribute of the plurality of items;
 vi) creating an attribute field identifier corresponding to each defined attribute of the plurality of items, said attribute field identifiers comprising a set of attribute field identifiers; and
 vii) utilizing said first object, said object field, said object field identifier, said attribute, and said set of attribute field identifiers to efficiently store said portion of said information regarding said plurality of items in said object fields.

11. The method of claim 6, further comprising:
 (g) establishing an item database on a server computer system, the item database storing information relating to a second plurality of items.

12. The method of claim 11, further comprising:
 (h) comparing the captured parsed information to the item database.

13. The method of claim 12, further comprising:
 (i) responsive to a pre-established rule, revising the information stored in said item database relating to the second plurality of items to include the information relating to the first plurality of items.

14. A method of adding information about items to a database holding information concerning a plurality of items, the method comprising:
 a) detecting and capturing information about a product from a provider computer system;
 b) querying a product database to determine whether the product database contains a product object corresponding to the product;
 c) determining that the product database does not include the product object corresponding to the product; and
 d) creating a new product object corresponding to the information about the product.

15. The method of claim 14, further comprising:
 (e) creating a new vendor object corresponding to the information about the product.

16. The method of claim 14, further comprising:
 (f) verifying the information detected and captured in (a).

* * * * *

UNITED STATES PATENT AND TRADEMARK OFFICE
CERTIFICATE OF CORRECTION

PATENT NO. : 7,584,210 B2 Page 1 of 1
APPLICATION NO. : 11/068424
DATED : September 1, 2009
INVENTOR(S) : Wight et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 824 days.

Signed and Sealed this

Fourteenth Day of September, 2010

David J. Kappos
*Director of the United States Patent and Trademark Office*